3,356,423
AIR BRAKE WITH A SUPPLEMENTARY RESERVOIR
Charles E. Hart, Watertown, N.Y., assignor to The New York Air Brake Company, a corporation of New Jersey
Filed Oct. 27, 1965, Ser. No. 505,385
1 Claim. (Cl. 303—46)

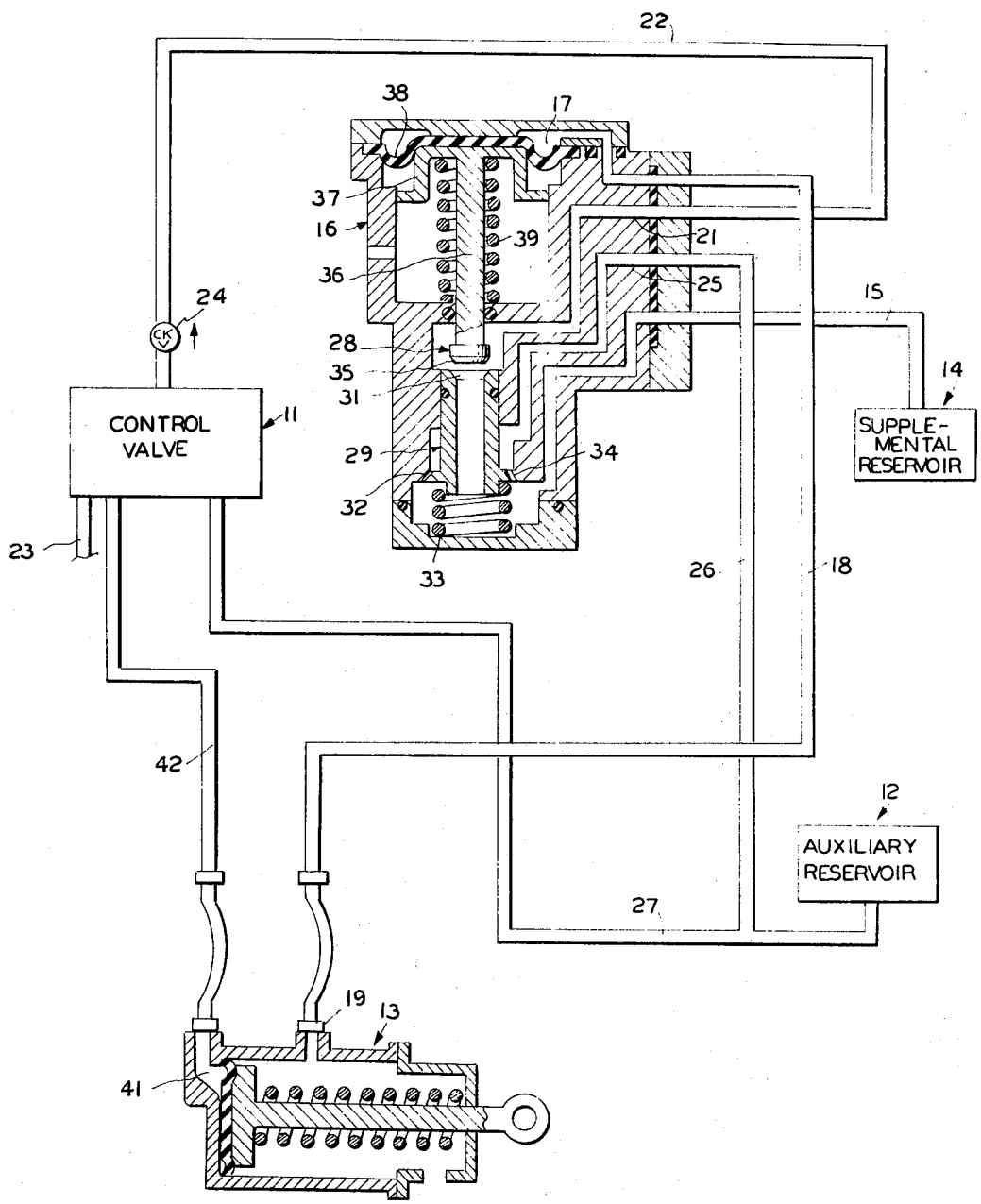

This invention relates to air brakes. Specifically it relates to means for supplementing the volume of the auxiliary reservoir of automatic brake systems when brake cylinder piston travel exceeds a predetermined amount. Excessive piston travel may result either from wear of the braking surfaces or from slack in the brake rigging or from both causes.

In an automatic brake system when a full service application of the brakes is made, the pressure in the auxiliary reservoir equalizes with that in the brake cylinder. When brake cylinder piston travel is larger than normal, this equalization pressure falls and results in a reduction in the available braking force. Because the brake cylinder piston travel is not the same on all cars, the different cars will not be subject to the equal braking forces. If this difference is too great, the uneven braking may result in damage to the cars or to their lading.

While apparatus has been suggested in the past for the purpose of supplementing auxiliary reservoir pressure, these have not become commercial either because of their complexity or their unreliability or because they interfered with the normal functions of the brake control valve. According to the present invention, it is necessary to add only a single reservoir, a supply and exhaust valve and a control passage to control movement of the supply and exhaust valve. The control passage is a piston-controlled port in the side wall of the brake cylinder.

Briefly, the invention includes a supplemental reservoir charged from the brake pipe through a check valve and a supply and discharge valve when in supply position. Fluid from this reservoir is discharged into the auxiliary reservoir when the supply and discharge valve is in discharge position. An actuating motor is provided for the supply and exhaust valve which will receive pressure through a control passage from the brake cylinder when piston travel exceeds a predetermined amount. The actuating motor is arranged so that it will not shift the supply and discharge valve unless the pressure in the control passage exceeds a predetermined amount. This is an important feature of the invention because it assures that the normal quick service function of the brake control valve is not interfered with by reason of flow from the supplemental reservoir to the auxiliary reservoir.

The accompanying drawing is a schematic showing of a simple, single car's brake equipment including the present invention.

As shown in the drawing, the braking system includes a control valve 11. This control valve may be any conventional automatic control valve, for example, the familiar AB valve. This system also includes an auxiliary reservoir 12 and a brake cylinder 13. The so-called emergency reservoir is not illustrated, but, of course, would be present if an AB control valve were being used.

In addition to these components of a conventional braking system, the system according to the present invention includes a supplemental reservoir 14 connected by a conduit 15 with a supply and discharge valve 16. The supply and discharge valve 16 is preferably a conventional relay air valve of a type which is commercially available.

Relay air valve 16 includes a valve-operating motor chamber 17 which is connected through a pipe line 18 to a piston-controlled side port 19 in the brake cylinder. The supply port 21 of the relay air valve is connected by pipe line 22 to an interior chamber in the control valve 11 which is subject to brake pipe pressure. The brake pipe connection appears at 23. A check valve 24 is provided in the pipe line 22 and will permit supply flow from the brake pipe to the relay air valve 16 but will inhibit flow in the reverse direction. The discharge connection 25 of the relay air valve 16 is connected through pipe line 26 with the auxiliary reservoir connection 27.

As shown, the relay air valve 16 includes upper and lower valve elements 28 and 29, respectively. The lower valve element 29 is cylindrical and has a through bore in the upper end of which is formed a valve seat 31. The lower end of the valve member 29 is encircled by a valve head 32. Spring 33 biases the valve head 32 toward its seat 34. The upper valve member 28 includes the valve head 35 which coacts with the seat 31. The stem 36 of valve member 28 is connected with a follower assembly 37 attached to the slack actuating diaphragm 38. A spring 39 reacts between the follower 37 and the body of the relay air valve 16 and urges the valve member 28 toward its illustrated position. The working space 41 of the brake cylinder is connected by pipe line 42 with the control valve 11.

As shown in the drawing, the parts are illustrated in the positions they would assume when the control valve 11 is in its release position. When a brake application is made, fluid under pressure will be admitted to the brake cylinder working chamber 41 from the auxiliary reservoir 12, this flow taking place through control valve 11 and connection 27. In the illustrated position, fluid under pressure is supplied from the brake pipe 23, through the control valve 11, the check valve 24 and pipe line 22 to the supply connection 21 of the relay air valve 16. In the illustrated position, the supply connection 21 is in communication with the supplemental reservoir 14 and this reservoir will be charged to brake pipe pressure. As will be apparent, the discharge connection 26 of the relay air valve, which communicates with the auxiliary reservoir line 27, is closed off because the valve 34 is seated. Under normal conditions, the brake cylinder piston will not travel far enough to overtravel the side port 19. Thus the motor chamber 17 is connected to atmosphere through the rod end of the brake cylinder. Thus, under normal application conditions, the relay air valve remains in its illustrated position. If the brake cylinder piston during an application moves far enough to place the side port 19 in communication with the working chamber 41, pressure fluid will pass from the brake cylinder to the motor chamber 17 of the relay air valve 16. This pressure, when it reaches a chosen value, for example, 10 lbs., will overcome the bias of springs 39 and 33, and cause the relay air valve to assume its other operating position. In this other operating position, supply connection 22 is cut off from communication with supplemental reservoir 14 by seating of the valve 35 against its seat 31. The supplemental reservoir 14 is placed in communication with the discharge connection 25 by reason of the valve 32 being moved away from its seat 34. It will be apparent that when brake cylinder piston travel is excessive, that is, when the port 19 is overtraveled and also when the pressure in the working chamber 41 of the brake cylinder reaches a predetermined value, the supplemental reservoir 14 is placed in communication with the auxiliary reservoir line 27 so that the fluid under pressure in the supplemental reservoir is available as an additional supply connection to the brake cylinder. Under normal operating conditions, the brake cylinder receives its pressure only from the auxiliary reservoir 12 through the connection 27 of the control valve 11. As has been explained in the opening portion of this specification, it is desirable that brake cylinder pressure be maintained equal on all of the cars not only for reasons of safety but also for uniform braking throughout the train. If the volume of the brake cylinder working chamber 41 is unusually large because of excessive piston travel, the equalization pressure which will result from the communication between the auxiliary reservoir 12 and the working chamber 41 will be unusually low. The additional volume of fluid under full pressure from the supplemental reservoir 14 will, according to the present invention, compensate the brake cylinder pressure to restore it to a value more nearly equal to that which will be realized in a brake cylinder having normal piston travel.

It is an important feature of the invention that the relay air valve 16 is not moved from its normal position until the pressure in the motor chamber 17 reaches the predetermined value of 10 lbs. If it moves sooner, the flow from the supplemental reservoir 14 to the brake cylinder would interfere with the normal quick service function of the control valve 11.

What is claimed is:

In an automatic fluid pressure brake of the type including a normally charged brake pipe, a control valve associated therewith, an auxiliary reservoir, a brake cylinder, and flow connections controlled by the control valve and effective in the release position of the control valve to interconnect the brake pipe and the auxiliary reservoir and vent the brake cylinder and effective in the application position of the control valve to disconnect the brake pipe from the auxiliary reservoir and interconnect the auxiliary reservoir and the brake cylinder, the improvement comprising: a supply connection extending from the brake pipe; a discharge connection extending from the auxiliary reservoir; a supplementary reservoir; a three-way valve, controlling communication between the supply connection, the discharge connection and the supplemental reservoir, shiftable between a first position in which it interconnects the charging connection and the supplementary reservoir while isolating the controlled connection, and a second position in which it isolates the charging connection and interconnects the supplementary reservoir and the discharge connection; fluid pressure motor means to shift the three-way valve between first and second positions; a piston-controlled side port in the brake cylinder effective when overtraveled to supply fluid under pressure to said motor means, and effective to vent said connection at other times; and biasing means to maintain said three-way valve in first position until the pressure in said motor reaches a predetermined value.

References Cited

UNITED STATES PATENTS

| | | | |
|---|---|---|---|
| 3,278,239 | 10/1966 | Klaus et al. | 303—85 X |
| 3,279,865 | 10/1966 | Bohn | 303—85 X |

MILTON BUCHLER, *Primary Examiner.*

T. M. BLIX, *Assistant Examiner.*